(12) United States Patent
Sugimoto et al.

(10) Patent No.: US 6,672,723 B2
(45) Date of Patent: Jan. 6, 2004

(54) LIQUID CRYSTAL PROJECTOR

(76) Inventors: Hideki Sugimoto, c/o Sony Semiconductor Kyushu Corporation, 2-3-2 Momochihama, Sawara-ku, Fukuoka-shi, Fukuoka (JP); Shinya Watanabe, c/o Sony Corporation, 7-35, Kitashinagawa 6-chome, Shinagawa-ku, Tokyo (JP); Yoshifumi Akaike, c/o Sony Corporation, 7-35, Kitashinagawa 6-chome, Shinagawa-ku, Tokyo (JP)

( * ) Notice: Subject to any disclaimer, the term of this patent is extended or adjusted under 35 U.S.C. 154(b) by 0 days.

(21) Appl. No.: 10/228,422

(22) Filed: Aug. 27, 2002

(65) Prior Publication Data

US 2003/0043349 A1 Mar. 6, 2003

(30) Foreign Application Priority Data

Aug. 29, 2001 (JP) ........................................ 2001-259755

(51) Int. Cl.[7] ................................................ G03B 21/16
(52) U.S. Cl. ............................... 353/61; 353/60; 353/57
(58) Field of Search ................................ 353/60, 61, 57

(56) References Cited

U.S. PATENT DOCUMENTS 8,132,049 * 10/2000 Yamaguchi et al. .......... 353/61
6,488,380 B1 * 12/2002 Fujimori ..................... 353/119

\* cited by examiner

*Primary Examiner*—Russell Adams
*Assistant Examiner*—Michael Dalakis
(74) *Attorney, Agent, or Firm*—Robert J. Depke; Holland & Knight LLC

(57) ABSTRACT

The invention provides a liquid crystal projector which can blast an increased amount of cooling air to raise the cooling efficiency without increasing the size of an optical prism unit. The liquid crystal projector includes a dichroic prism, a base for securing the dichroic prism with a lower plate interposed therebetween, a plurality of liquid crystal panel units disposed on side faces of the dichroic prism, and a cooling fan disposed below the base. The base has air holes formed therein such that air current generated by the cooling fan is introduced to the liquid crystal panel units through the air holes to cool the liquid crystal panel units. The lower plate has inclined faces at portions thereof which oppose to the air holes of the base.

7 Claims, 4 Drawing Sheets

LIQUID CRYSTAL PROJECTOR

This application claims priority to Japanese Patent Application Number JP2001-259755 filed Aug. 29, 2001, which is incorporated herein by reference.

BACKGROUND OF THE INVENTION

This invention relates to a liquid crystal projector which includes an optical prism unit in which a liquid crystal panel which modulates light in response to a video signal is used.

A liquid crystal projector is known which uses a liquid crystal panel which modulates light in response to a video signal in order to obtain a project image screen of a large size. A conventional liquid crystal projector includes, as principal components thereof, a light source lamp unit, an irradiation optical unit for spectrally separating white light from the light source into light components of red, blue and green and condensing the spectrally separated color light components, an optical prism unit including liquid crystal panels for modulating the condensed light components in response to image information and a dichroic prism for color synthesizing the modulated light components, a projection optical unit for projecting the color synthesized light in an enlarged scale, and a circuit unit including a power supply circuit, a signal processing circuit and so forth.

In recent years, in a liquid crystal projector, a high resolution liquid crystal panel is used in order to project image information as a more distinct picture, and increase in brightness is promoted in order to make the projection screen brighter. A liquid crystal projector of the type described incorporates cooling apparatus for individually cooling the light source lamp unit, circuit unit and liquid crystal panel unit which act as internal heat generating sources. Usually, the cooling apparatus include a cooling fan disposed therein suitably for their application in such a manner as to suck air outside a cabinet into the inside of the cabinet and blast the air to the pertaining unit or units.

FIGS. 5A and 5B show a general configuration of a conventional optical prism unit, and wherein FIG. 5A is a plan view and FIG. 5B is a sectional view taken along line B—B of FIG. 5A.

Referring to FIGS. 5A and 5B, the optical prism unit 50 shown includes an upper plate 51 and a lower plate 52, a dichroic prism 53 held between the upper plate 51 and the lower plate 52, and three liquid crystal panel units 54, 55 and 56 secured to three different faces of the dichroic prism 53 into which light is introduced. A cooling fan 57 for cooling the optical prism unit 50 is disposed below the lower plate 52. The upper plate 51 and the lower plate 52 are rectangular parallelepipeds and are held in contact with the top and bottom faces of the dichroic prism 53 to held the dichroic prism 53 therebetween.

Air holes 59 for introducing air current from the cooling fan 57 therethrough are formed in a base 58 for the lower plate 52. The air holes 59 are disposed below the liquid crystal panel units 54, 55 and 56 so that air may be brought into direct contact with the liquid crystal panel units 54, 55 and 56. Thus, blast air from the cooling fan 57 passes through the air holes 59 and is brought into direct contact with the liquid crystal panel units 54, 55 and 56 to cool the liquid crystal panel units 54, 55 and 56. The bottom face of the lower plate 52 contacts over the entire area thereof with the base 58 having the configuration just described so that the dichroic prism 53 and so forth are held stably on the base 58.

In recent years, it is demanded to reduce the size of a liquid crystal projector so that it can be carried conveniently. However, since reduction of the size decreases a heat radiating space, the cooling efficiency is deteriorated. Further, as the brightness is increased, the liquid crystal panel generates an increased amount of heat. Therefore, it is a subject to cool the liquid crystal panel units and other units to temperatures lower than their heat-resistant temperatures. In other words, it is a subject to raise the cooling efficiency together with increase of the brightness and reduction of the size.

In the optical prism unit 50 shown in FIGS. 5A and 5B, since the size of the air holes 59 is restricted by the arrangement of the lower plate 52 and the optical units including condensing lenses and mirrors, it is difficult to increase the cooling air amount to the liquid crystal panel units 54, 55 and 56 without increasing the size of the optical prism unit 50. In other words, with the conventional structure, it is difficult to increase the cooling air amount and lower the temperatures in operation of the liquid crystal panels and so forth while reduction of the size is achieved.

SUMMARY OF THE INVENTION

It is an object of the present invention to provide a liquid crystal projector which can blast an increased amount of cooling air to raise the cooling efficiency without increasing the size of an optical prism unit.

In order to attain the object described above, according to an aspect of the present invention, there is provided a liquid crystal projector including a dichroic prism, a base for securing the dichroic prism with a plate interposed therebetween, a liquid crystal panel unit disposed on a side face of the dichroic prism, and a cooling fan disposed below the base, the base having an air hole formed therein such that air current generated by the cooling fan is introduced to the liquid crystal panel unit through the air hole to cool the liquid crystal panel unit, a portion of the plate which opposes to the air hole of the base being formed so as to have an inclined face, a curved face or a cutaway portion.

With the liquid crystal projector, the sectional area of the flow path for the air current generated by the cooling fan can be increased by the inclined face, curved face or cutaway portion formed on the plate. Consequently, an increased amount of cooling air can be introduced to the liquid crystal panel unit to cool the liquid crystal panel unit efficiently. More particularly, since the portion of the plate which opposes to the air hole of the base is formed so as to have an inclined face, a curved face or a cutaway portion, it can introduce an increased amount of cooling air to the liquid crystal panel unit to cool the liquid crystal panel unit efficiently. Consequently, the amount of cooling air can be increased to raise the cooling efficiency to lower the temperature in operation of the liquid crystal panel unit without increasing the speed of rotation or the size of the cooling fan. Further, where the cooling efficiency is raised, the speed of rotation or the size of the cooling fan can be reduced, and therefore, a cooling fan of a reduced size can be used to augment the quietness of the liquid crystal projector. Further, since the temperature in operation of the liquid crystal panel unit can be kept low, the life and the reliability of the liquid crystal panel unit are augmented.

According to another aspect of the present invention, there is provided a liquid crystal projector including a dichroic prism, a base for securing the dichroic prism with a plate interposed therebetween, a plurality of liquid crystal panel units disposed on side faces of the dichroic prism, a cooling fan disposed below the base, the base having air holes formed therein such that air current generated by the cooling fan is introduced to the liquid crystal panel units through the air holes to cool the liquid crystal panel units, and air current guiding means provided between the cooling fan and the base for introducing the air current to a particular one of the side faces of the dichroic prism on which a particular one of the liquid crystal panel units is disposed.

With the liquid crystal projector, since the air current guiding means is provided between the cooling fan and the base for introducing the air current to the particular side face of the dichroic prism on which the particular liquid crystal panel unit is disposed, air current generated by the cooling fan can be introduced in a concentrated manner to the particular liquid crystal panel unit which exhibits a comparatively high temperature in operation. Consequently, the temperatures in operation of the liquid crystal panel units can be made uniform among them. Therefore, there is no necessity any more to raise the speed of rotation or increase the size of the cooling fan in accordance with that one of the liquid crystal panel units which exhibits a comparatively high temperature in operation.

Where the liquid crystal panel units are liquid crystal panel units for red, green and blue, preferably the liquid crystal panel unit for blue is disposed on the particular side face of the dichroic prism. Since the liquid crystal panel unit for blue exhibits a higher temperature in operation than the other liquid crystal panel units for red and green, it is desirable to cool the liquid crystal panel unit for blue in a concentrated manner. In other words, the different temperatures in operation (blue>green>red) of the liquid crystal panel units for red, green and blue which are caused by a difference in wavelength of transmission light through them can be uniformed. Therefore, there is no necessity any more to raise the speed of rotation or increase the size of the cooling fan in accordance with the liquid crystal panel unit for blue which exhibits the highest temperature in operation.

Preferably, the air current guiding means is an inclined face provided on the plate. The air current generated by the cooling fan can be introduced to the particular face of the dichroic prism efficiently along the inclined face provided on the plate. In particular, the air current generated by the cooling fan and introduced in through the air holes of the base is introduced to the particular liquid crystal panel unit by the inclined face formed on the plate and cools the particular liquid crystal panel unit efficiently. Consequently, the temperature in operation of the particular liquid crystal panel unit on the particular face of the dichroic prism can be lowered without increasing the size of the plate.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Figure 1:
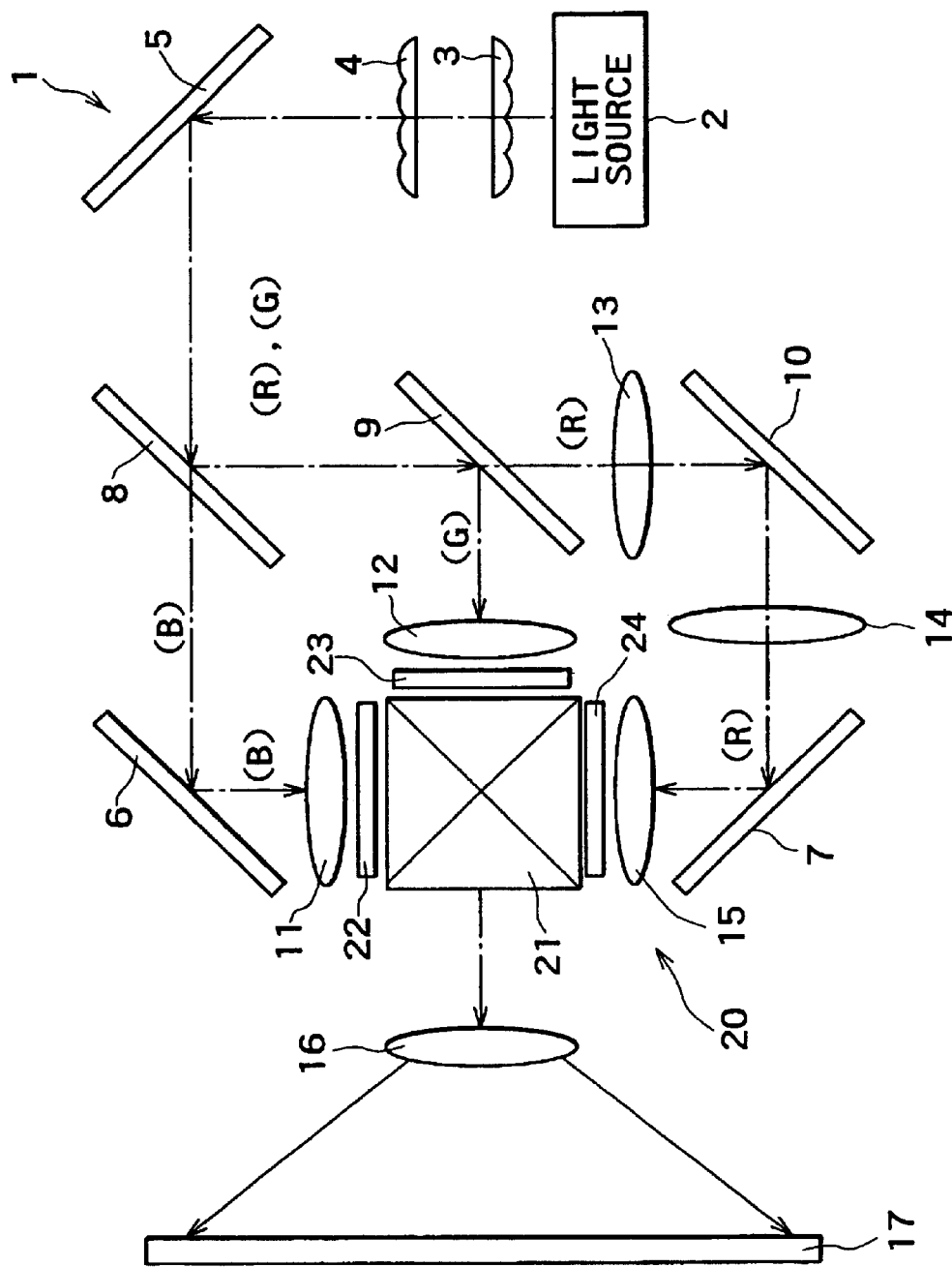
FIG. 1 is a schematic view showing an optical system of a liquid crystal projector to which the present invention is applied.

Referring to FIG. 1, there is shown an optical system of a liquid crystal projector to which the present invention is applied. The liquid crystal projector 1 shown includes a light source lamp unit including a light source 2 and a pair of integrator lenses 3 and 4, an irradiation optical unit including total reflection mirrors 5, 6, 7 and 10, a dichroic mirror 8 for reflecting red light and green light but passing only blue light therethrough, a dichroic mirror 9 for reflecting only green light and condensing lenses 11, 12, 13, 14 and 15 for spectrally separating white light from the light source 2 into light components of red, blue and green and condensing the spectrally separated color light components, an optical prism unit 20 including three liquid crystal panel units 22, 23 and 24 for modulating the condensed color light components of blue, green and red in response to image information, respectively, and a dichroic prism 21 for color synthesizing the modulated light components, a projection optical unit 16 including a projection lens for projecting the color synthesized light in an enlarged scale, a power supply circuit not shown, a signal processing circuit not shown, and so forth.

In the liquid crystal projector 1 having the configuration described above, white light emitted from the light source 2 is spectrally separated into color components of the three primary colors of blue, green and red by the irradiation optical unit, and the color components are modulated by the corresponding liquid crystal panel units 22, 23 and 24 to form an image for blue, another image for green and a further image for red, respectively. The images formed by the liquid crystal panel units 22, 23 and 24 are synthesized by the dichroic prism 21, and the thus synthesized color image is projected on a screen 17 disposed at a predetermined position by the projection optical unit 16.

Figure 2A:
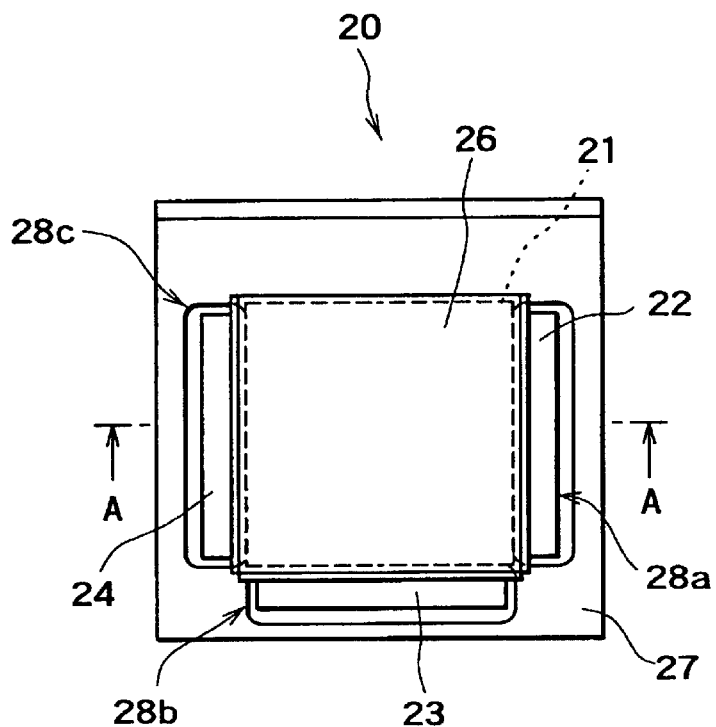
FIG. 2A is a plan view of an optical prism unit and associated elements of the optical system of FIG. 1
Figure 2B:
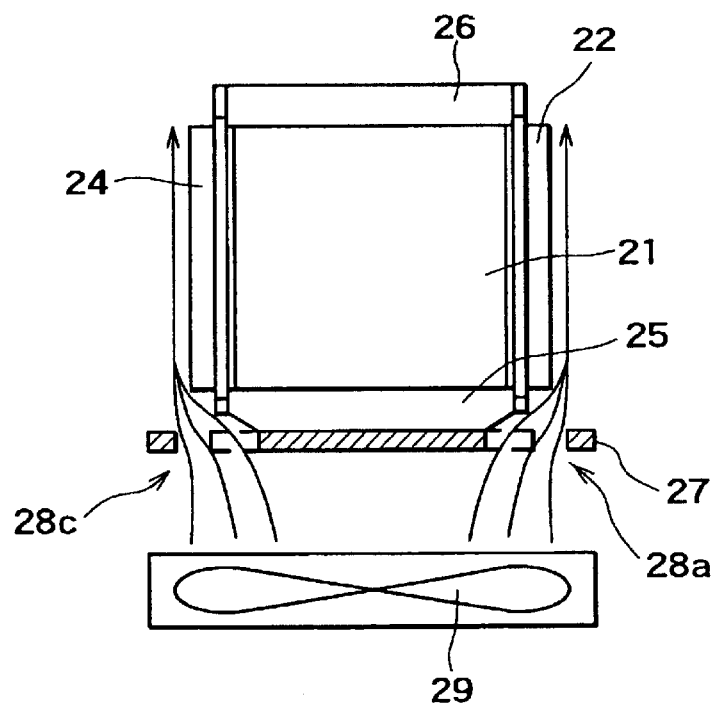
FIG. 2B is a sectional view taken along line A—A of FIG. 2A.

In FIG. 2B, the arrow mark means air current and it means the same in following FIGS. Referring now to FIGS. 2A and 2B, the optical prism unit 20 includes a lower plate 25 of a parallelepiped disposed directly below the dichroic prism 21 and partly cut away at a bottom portion thereof, and an upper plate 26 of a parallelepiped disposed directly above the dichroic prism 21. The lower plate 25 and the upper plate 26 are secured to the dichroic prism 21 individually by a bonding agent. A base 27 for securing the optical prism unit 20 is disposed on a lower face of the lower plate 25, and the base 27 and the lower plate 25 are positioned relative to each other by means of a knock pin not shown and secured to each other by bolts not shown.

The three liquid crystal panel units 22, 23 and 24 for blue, green and red are disposed on three faces of the optical prism unit 20 into which light is introduced. Each of the liquid crystal panel units 22, 23 and 24 is formed from a liquid crystal panel for blue, green or red, a transparent glass substrate adhered to the light incoming face of the liquid crystal panel, and a polarization plate and a phase difference plate adhered to the light outgoing face of the liquid crystal panel.

The base 27 has air holes 28a, 28b and 28c formed at positions thereof below the liquid crystal panel units 22, 23 and 24 in such a manner as to extend through the base 27, respectively. A cooling fan 29 for cooling the liquid crystal panel units 22, 23 and 24 is disposed below the base 27 such that air current generated by the cooling fan 29 is introduced to the liquid crystal panel units 22, 23 and 24 on the upper face side of the base 27 through the air holes 28a, 28b and 28c of the base 27.

Figure 5A:
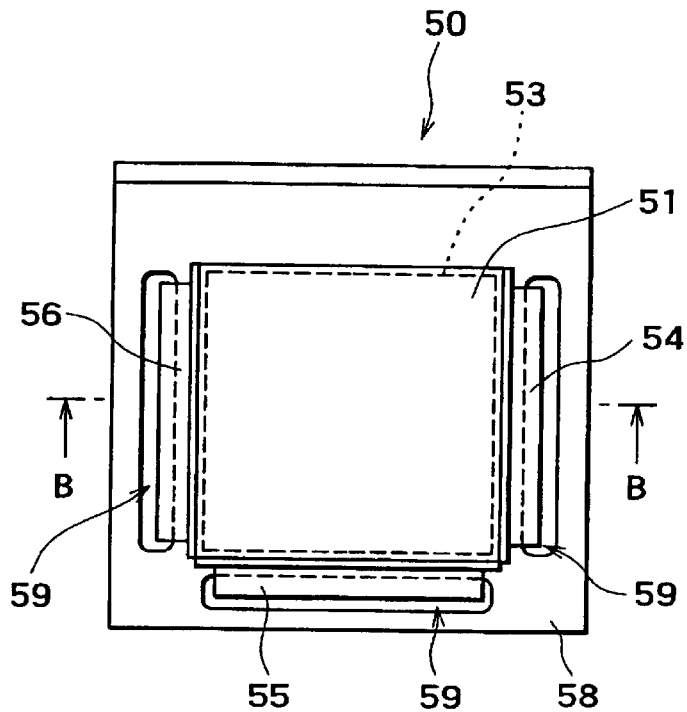
FIG. 5A is plan view showing a conventional optical prism unit and associated elements and FIG. 5B is a sectional view taken along line B—B of FIG. 5A.
Figure 5B:
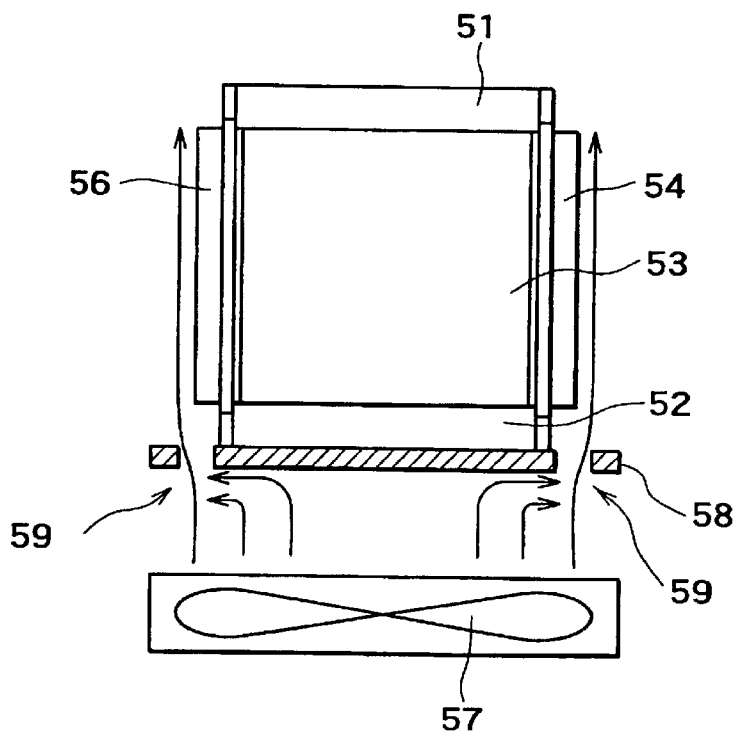

The lower plate 25 is partly cut away at portions of a bottom portion of the parallelepiped thereof on the inner sides with respect to the liquid crystal panel units 22, 23 and 24 such that the portions thereof opposing to the air holes 28a, 28b and 28c of the base 27 have inclined faces. Through the configuration just described, the opening areas of the air holes 28a, 28b and 28c can be formed with a size greater than that of the conventional optical prism unit described hereinabove with reference to FIG. 5.

In particular, in the optical prism unit of the present embodiment, by partly cutting away the portions of the lower plate 25 on the inner sides with respect to the liquid crystal panel units 22, 23 and 24 to form inclined faces at the portions opposing to the air holes 28a, 28b and 28c, the flow path for air current of the cooling fan 29, which is intercepted by the lower plate 25 in the conventional optical prism unit, can be released to increase the sectional area of the flow path.

Accordingly, it is possible to introduce a greater amount of cooling air to the liquid crystal panel units 22, 23 and 24 to cool them efficiently. Thus, it is possible to increase the amount of cooling air around the liquid crystal panel units 22, 23 and 24 thereby to raise the cooling efficiency to lower the temperature in operation of each of the liquid crystal panel units 22, 23 and 24 without increasing the speed of rotation of the cooling fan 29 and without increasing the size of the cooling fan 29.

Further, since the speed of rotation of the cooling fan 29 or the size of the cooling fan 29 can be decreased as a result of the raised cooling efficiency, the liquid crystal projector of the present embodiment is improved in terms of the quietness while noise of the cooling fan 29 is reduced. Further, since the temperature in operation of each of the liquid crystal panel units 22, 23 and 24 can be kept low, the life and the reliability of the liquid crystal panel units 22, 23 and 24 are augmented.

It is to be noted that, while, in the arrangement shown in FIGS. 2A and 2B, the portions of the lower plate 25 opposing to the air holes 28a, 28b and 28c of the base 27 are formed as inclined faces, they may have different faces of different shapes such as curved faces capable of introducing air current from the air holes 28a, 28b and 28c efficiently to the liquid crystal panel units 22, 23 and 24.

Figure 3:
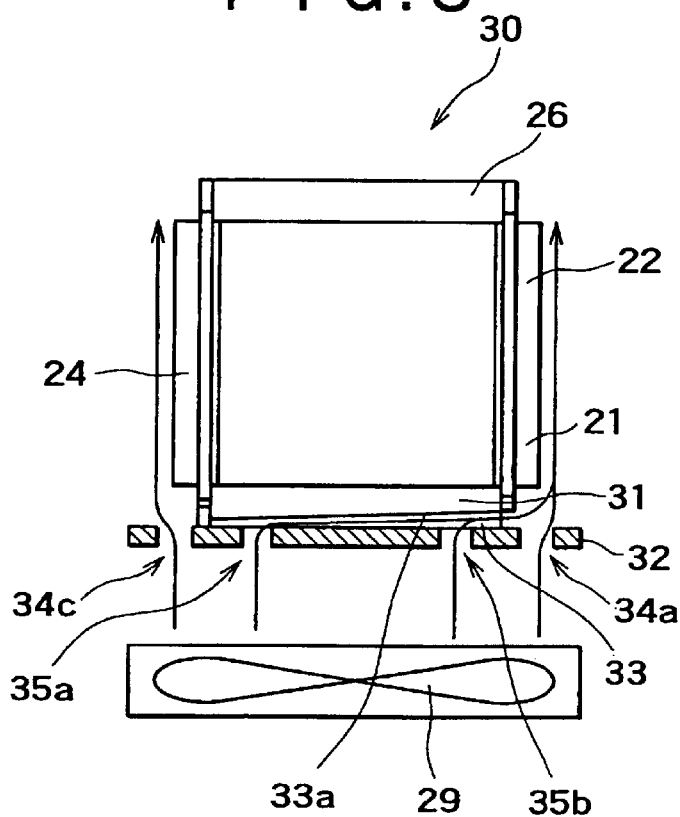
FIG. 3 is a sectional view showing another optical prism unit which can be incorporated in the optical system of FIG. 1.
Figure 4:
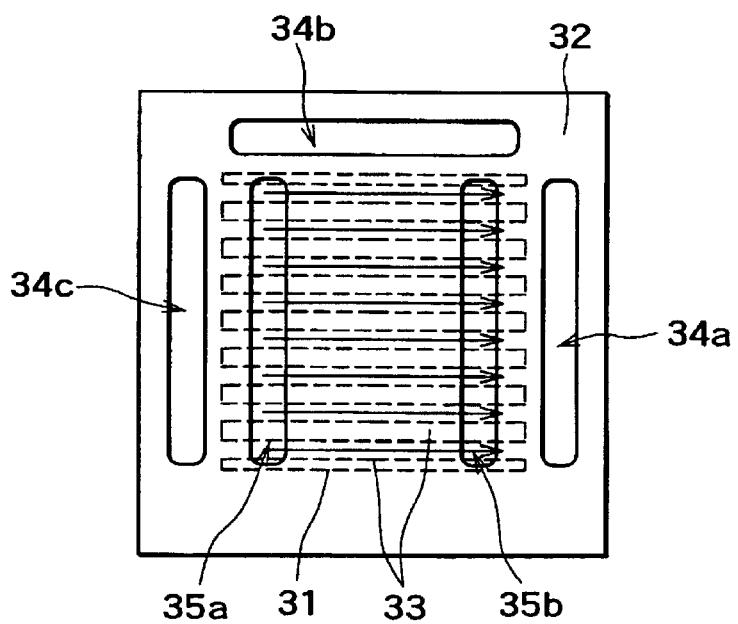
FIG. 4 is a bottom plan view of a lower plate of the optical prism unit of FIG. 3.

FIG. 3 shows another configuration of the optical prism unit which can be incorporated in the liquid crystal projector to which the present invention is incorporated, and FIG. 4 shows a lower plate of the optical prism unit of FIG. 3. The optical prism unit 30 shown in FIG. 3 is a modification to the optical prism unit described above with reference to FIGS. 2A and 2B and includes a dichroic prism 21, liquid crystal panel units 22, 23 and 24, an upper plate 26 and a cooling fan 29 similar to those of FIGS. 2A to 2B. However, the optical prism unit of FIG. 3 is different from that of FIGS. 2A and 2B in that it includes an air current guiding mechanism disposed between a lower plate 31 and a base 32 for introducing air current of the cooling fan 29 to the side face of the dichroic prism 21 on which the liquid crystal panel unit 22 for blue is disposed.

Referring to FIGS. 3 and 4, the lower plate 31 has a plurality of grooves 33 formed on a face thereof at which it contacts with the base 32. The grooves 33 are formed by cutting away the lower plate 31 deeply upwardly from a portion of the lower plate 31 adjacent the liquid crystal panel unit 24 for red toward another portion of the lower plate adjacent the liquid crystal panel unit 22 for blue. In other words, the grooves 33 are formed such that upper faces 33a thereof are inclined in such a direction as to approach the liquid crystal panel unit 22 for blue as seen in FIG. 3.

The base 32 has air holes 34a, 34b and 34c formed at positions thereof below the liquid crystal panel units 22, 23 and 24, respectively, such that they extend through the base 32. Further, the base 32 has two air holes 35a and 35b provided at the opposite end portions of the grooves 33 at the portion thereof at which the base 32 contacts with the lower plate 31 such that they extend across the grooves 33.

In the optical prism unit 30 having the configuration described above, air current generated by the cooling fan 29 is introduced to the liquid crystal panel units 22, 23 and 24 through the air holes 34a, 34b and 34c disposed below the liquid crystal panel units 22, 23 and 24, respectively, and is introduced in a concentrated manner to the liquid crystal panel unit 22 for blue from the air holes 35a and 35b through the grooves 33.

In this instance, since the grooves 33 are formed such that the upper faces 33a thereof are inclined in such a manner as to approach the liquid crystal panel unit 22 for blue, air current introduced into the grooves 33 from the air holes 35a and 35b is introduced efficiently to the liquid crystal panel unit 22 along the inclined upper faces 33a of the grooves 33.

In other words, with the arrangement of FIGS. 3 and 4, while the temperatures in operation of the liquid crystal panel units 22, 23 and 24 in the optical prism unit 30 differ from one another depending upon the differences among wavelengths of transmission light therethrough, air current is introduced in a concentrated manner toward the liquid crystal panel unit 22 for blue which exhibits the highest temperature in operation. Consequently, the temperatures in operation of the liquid crystal panel units 22, 23 and 24 can be made uniform.

Accordingly, it is not necessary to raise the speed of rotation of the cooling fan 29 or increase the size of the cooling fan 29 in conformity with the liquid crystal panel unit 22 for blue which has the high temperature in operation. Thus, even if the liquid crystal panels have a higher resolution and generate an increased amount of heat, a cooling fan of an equivalent performance which generates equivalent noise may be used for the liquid crystal panels.

While a preferred embodiment of the present invention has been described using specific terms, such description is for illustrative purposes only, and it is to be understood that changes and variations may be made without departing from the spirit or scope of the following claims.

What is claimed is:

1. A liquid crystal projector, comprising:

a dichroic prism;

a base for securing said dichroic prism with a plate interposed therebetween;

a plurality of liquid crystal panel units disposed on side faces of said dichroic prism;

a cooling fan disposed below said base;

said base having first air hole means formed therein such that air current generated by said cooling fan is introduced to said liquid crystal panel units to cool said liquid crystal panel unit;

said plate having a first surface opposed to said dichroic prism and a second surface opposed to said base, wherein said first surface is substantially a same planar dimension as a bottom surface of the dichroic prism; and an air current guiding means, which is inclined and extends from one edge to an opposite edge of a second surface of said plate for introducing the air current to a particular one of the side faces of said dichroic prism on which a particular one of said liquid crystal panel units is disposed.

2. A liquid crystal projector according to claim 1, wherein said liquid crystal panel units are liquid crystal panel units for red, green and blue, and the liquid crystal panel unit for blue is disposed on a particular side face of said dichroic prism.

3. A liquid crystal projector according to claim 1, wherein said air current guiding means is comprised of a plurality of grooves.

4. A liquid crystal projector according to claim 1, wherein said base has second air hole means formed outside of said first air hole means for introducing air to any one of said liquid crystal units.

5. A liquid crystal projector according to claim 2, wherein said base has second air hole means formed outside of said first air hole means for introducing air to any one of said liquid crystal units.

6. A liquid crystal projector according to claim 3, wherein said base has second air hole means for introducing air to any one of said liquid crystal units.

7. A liquid crystal projector, comprising:

a dichroic prism;

a base for securing said dichroic prism with a plate interposed therebetween;

a plurality of liquid crystal panel units disposed on side faces of said dichroic prism;

a cooling fan disposed below said base;

said base having first air hole means formed therein such that air current generated by said cooling fan is introduced to said liquid crystal panel units to cool said liquid crystal panel unit; and said plate having a first surface opposed to said dichroic prism and a second surface opposed to said base, wherein said first surface is substantially a same planar dimension as a bottom surface of the dichroic prism; and an air current guiding means, which is inclined and extends from near one edge to near an opposite edge of a second surface of said plate for introducing the air current to a particular one of the side faces of said dichroic prism on which a particular one of said liquid crystal panel units is disposed.

* * * * *